2,779,671
Patented Jan. 29, 1957

United States Patent Office

2,779,671

PROCESS FOR GRANULATING SULFIDE ORES OR THE LIKE

Adolphe Denis Henri Léon Fassotte, Neerpelt, Belgium, assignor to Compagnie des Metaux d'Overpelt-Lommel et de Corphalie S. A., Overpelt-lez-Neerpelt, Belgium No Drawing. Application April 16, 1956,
Serial No. 578,204

1 Claim. (Cl. 75—3)

This invention is a continuation-in-part of Serial No. 273,130 of 23rd of February 1952, now abandoned, which relates to improvements in the granulation of sulfide ores or the like.

Owing to the fact that sulfide ore which has been concentrated by the flotation process is in a very finely divided state, it is often necessary to granulate it so as to avoid the numerous drawbacks due to the very finely divided state. Such drawbacks are for instance the lack of porosity of the layers of such fine materials and the losses entailed by the carrying away of material by gases or air, during reactions, handling or transportation.

It has sometimes been found preferable to compress the ore in the form of briquettes. For the hardening of such briquettes, use may be made of the oxidation of particles of zinc in the metal state by means of water and oxygen or air, in the presence of small amounts of a salt such as sulfate or chloride of zinc, iron, calcium, etc.

For the granulation of blende (zinc ore in which the zinc is in the form of sulfide), use has already been made of the property of sulfates and oxysulfates of zinc to crystallize. For obtaining a granulation, the raw blende has been mixed with sulfated blende dust from the dust-collecting chambers or the electrical dust-precipitation chambers (Cottrell) of a roasting plant; or alternatively, a small amount of roasted blende has been added to the raw blende, and some sulfuric acid added to the water which serves to moisten the ore, so as to produce sulfate of zinc by the reaction between the sulfuric acid and the roasted blende. The moistened raw blende containing the required amount of zinc sulfate and/or oxysulfate is kneaded and converted into a paste, which is immediately granulated, for instance by an extrusion process. The granulated product is then dried to eliminate the water which may be in excess relatively to the amount required for the crystallization of the zinc sulfate, thus imparting hardness to the material.

The above treatment is comparatively costly.

Indeed, the zinc sulfate crystallizes between 39° and 70° C. with 6 molecules of water, and below 39° C. with 7 molecules of water. As the drawing process or other granulation process requires a material in the form of a more or less plastic paste (obtained thanks to the viscosity of the concentrated solution of zinc sulfate which moistens the grains of blende), an important amount of water is required; such an amount must be sufficient to supply a quantity of water exceeding that required for the crystallization of zinc sulfate, so as to form a viscous solution that imparts plasticity to the blende. This water in excess of the crystallization water has to be afterwards entirely removed by heating.

There is also another serious drawback of the said known process. Grains which have thus been produced, must be kept more or less separate to prevent them from agglomerating together until they are dried by a subsequent heating operation.

The object of the present invention is to reduce the amount of water added and to avoid a drying operation for hardening the grains.

The present invention consists in a process for granulating sulfide ores comprising from about 2% to about 4% of sulfur in the form of zinc sulfate as a binder, or to which sulfur in the form of zinc sulfate may be added so as to reach a percentage of S as zinc sulfate of from about 2 to about 4%, the invention being characterized by the addition of an amount of water such that the ratio in weight of water to sulfur as zinc sulfate shall be comprised between about 2 and 4, the heating of the mixture at a working temperature comprised between 70° and 100° C., the kneading of the mixture at the working temperature to obtain a paste, the extrusion of the kneaded mixture at a temperature comprised between 70° and 100° C. through perforated supports to obtain small rods in a manner known "per se," and the cooling of the rods at a temperature comprised approximately between 0° and 70° C., thus obtaining a hardening of the rods.

The said percentage of S as zinc sulfate is preferably calculated with respect to a dry material. As to the amount of water above mentioned, it will produce both a saturated solution of $ZnSO_4$ and crystallized $ZnSO_4$. The latter will be in the form of $ZnSO_4.1H_2O$.

The grains may advantageously be produced under vacuum.

The zinc sulfate crystallizes with one molecule of water only above 70° C. Between 70 and 100° C., it is sufficient to add an amount of water of about 2 to 4 times the weight of S as $ZnSO_4$ (preferably about 3 times) to the mixture of ore and zinc sulfate, in order to convert the mixture by a kneading operation into a thick paste of satisfactory plasticity and capable of being easily granulated by an extrusion or other process. Owing to the fact that $ZnSO_4$ crystallizes with 6 molecules of water between 70 and 39° C., and that below 39° C. it crystallizes with 7 molecules of water, it would be necessary to use a much larger amount of water for the same amount of $ZnSO_4$, if working below 70° C., in order to obtain a paste having the same consistency.

Let us consider for instance the case of a paste prepared at 80° with an amount of water equal to 3 times the weight of S as $ZnSO_4$; in order to have at 50° C. the same quantity of liquid moistening the mass of solid material, it would be necessary to use 74% of water more than that required at 80° C. At 35° C., 94% more of water would be required.

It should be noted that since $ZnSO_4$ is used as a binder, it is advantageous to work at a temperature higher than 70° C. as long as the amount of water used varies between about 0.6 and about 6 times the weight of S as $ZnSO_4$, that is between the amount of water which is required to obtain crystallized $ZnSO_4.1H_2O$ from all the S as $ZnSO_4$, and the amount of water which is required to form a saturated solution of $ZnSO_4$ in water with all the $ZnSO_4$ available.

The grains produced at a temperature higher than 70° C. harden spontaneously by cooling because, below 70° C. the zinc sulfate crystallizes with 6 or 7 molecules of water. In so doing they fix some or all of the existing water in solid form and harden by using the newly formed crystals as a cement for the other solid particles. Moreover, as the cooling of the grains necessarily starts on their outside and since water is evaporated from their surface owing to the internal heat of the grains, the outer surface of the grains dries and hardens almost instantaneously and forms a thin dry crust which immediately prevents any sticking or flattening of the grains.

After cooling below 70° C., the grains become quite hard throughout their cross-section and can be handled, sized, stored in a hopper, etc. for any subsequent treatment or use.

However, it may be desirable for certain applications to reduce the amount of water in the grains, for instance when it is desired to obtain, by the roasting of the grains, sulfurous gases containing a smaller amount of water vapour. In order to attain such a result, the grains are sent, immediately after they have been formed, into a chamber in which a high vacuum has been produced, so as to utilize the heat of the grains for the evaporation of some of the water, during the natural cooling of the grains.

For carrying the invention into effect an apparatus may be used as shown in the original application Serial No. 273,130.

It has previously been proposed in U. S. P. No. 1,168,401 (Kippe) to produce briquets from finely divided zinc material by setting up binding conditions in said material by moistening it with a liquid containing a chemically reactive dissolved salt, then compressing said moistened mass and evaporating the solvent, leaving the dry salt distributed in the mass without cooperating in the coherence of the mass. In such a process, from ¼ to 2% only of a soluble salt in the moistening water, that is a very dilute solution, has been employed, and a natural cooling of the briquets after their heating resulting from exothermal reaction, has no influence upon their hardening.

In my own prior Patent No. 1,789,895, I have described a mechanical process for converting a fine ore material into the shape of small rods. I did not then contemplate reducing the initial amount of water needed to form the paste, by preparing and extruding the paste at a temperature comprised between 70 and 100° C., with subsequent cooling of the rods below 70° C., thus obtaining an economical hardening of the rods.

What I claim is:

In a process for granulating sulfide ores comprising from about 2% to about 4% of sulfur in the form of zinc sulfate as a binder, or to which sulfur in the form of zinc sulfate may be added so as to reach a percentage of S as zinc sulfate of from about 2 to about 4%, adding an amount of water such that the ratio in weight of water to sulfur as zinc sulfate shall be comprised between about 2 and 4, heating the mixture at a working temperature comprised between 70° C. and 100° C., kneading of the mixture at the working temperature to obtain a paste, extruding the kneaded mixture at a temperature comprised beween 70° and 100° C. through perforated supports to obtain in a manner known per se small rods, and cooling the rods at a temperature comprised approximately between 0° C. and 70° C., thus obtaining a hardening of the rods.

No references cited.